Sept. 28, 1965 E. J. WARD 3,209,342

APPARATUS FOR DETECTING AND INDICATING ALARM CONDITIONS IN A PROTECTED AREA

Filed May 23, 1960 6 Sheets-Sheet 1

INVENTOR.
EMMETT J. WARD
BY Christie, Parker & Hale
ATTORNEYS

Sept. 28, 1965 E. J. WARD 3,209,342

APPARATUS FOR DETECTING AND INDICATING ALARM CONDITIONS IN A PROTECTED AREA

Filed May 23, 1960 6 Sheets-Sheet 2

Sept. 28, 1965 E. J. WARD 3,209,342

APPARATUS FOR DETECTING AND INDICATING ALARM CONDITIONS IN A PROTECTED AREA

Filed May 23, 1960 6 Sheets-Sheet 4

Sept. 28, 1965 E. J. WARD 3,209,342

APPARATUS FOR DETECTING AND INDICATING ALARM CONDITIONS IN A PROTECTED AREA

Filed May 23, 1960 6 Sheets-Sheet 5

Sept. 28, 1965 E. J. WARD 3,209,342

APPARATUS FOR DETECTING AND INDICATING ALARM CONDITIONS IN A PROTECTED AREA

Filed May 23, 1960 6 Sheets-Sheet 6

United States Patent Office 3,209,342
Patented Sept. 28, 1965

3,209,342

APPARATUS FOR DETECTING AND INDICATING ALARM CONDITIONS IN A PROTECTED AREA

Emmett J. Ward, Sylmar, Calif., assignor, by mesne assignments, to Westinghouse Electric Corporation, a corporation of Delaware Filed May 23, 1960, Ser. No. 30,955
12 Claims. (Cl. 340—213)

This invention relates to a security alarm system and, more particularly, to a system for coordinating all industrial security requirements through a single control center.

The security requirements of an industrial plant may include such things as intrusion violation, temperature monitoring, pressure monitoring, process control supervision and the like. Standard detecting elements which produce an on-off indication may be used for generating an alarm signal when a disturbance of any of the above functions is encountered. Such alarms can be transmitted over wires to a central monitoring station where operating personnel can note the alarm and take appropriate action.

One of the difficulties of a centralized system covering all aspects of security has been the cost of extensive cabling between protected areas and the central security headquarters. One industrial plant may involve a number of building or separate working areas, each of which may involve hundreds of monitoring circuits.

The present invention provides a security system which requires only a single pair of wires communicating with the central security headquarters and each of the buildings in the security areas. This is accomplished by a unique multiplexing arrangement which permits the use of hundreds of protection circuits in each area which can be monitored at the central headquarters for instantly identifying an alarm condition.

In brief, the security system of the present invention has a control panel at each building or specified security area which is connected to a central headquarters console across a single telephone pair of wires. Each detecting element or protection unit within the area is connected to the area control panel across a single pair of wires and protection offered on a closed loop basis. Opening of any detection or protection loop results in the transmission of an alarm to the central security control console. Each area control panel includes means for generating a plurality of signals of different frequencies In response to the actuation of any one of a group of detection elements in a particular security area, a first selected group frequency signal is transmitted to the central station. Then, in response to a signal back from the central station, a second selected unit frequency signal, indicative of the particular detector element in the group, is transmitted to the central station. In addition, each group of detecting elements has associated with it a D.C. potential of a particular polarity which is applied across the pair of wires with respect to ground reference. At the central station, the first and second frequency signals plus the D.C. polarity are sensed and used to indicate by panel light the particular detection element actuated at the remote station.

For a more complete understanding of the invention, reference should be had to the accompanying drawings, in which:

FIG. 2 is a block diagram showing the manner in which FIGS. 3–7 are schematic diagrams showing the overall circuit of the security system.

Figure 1:
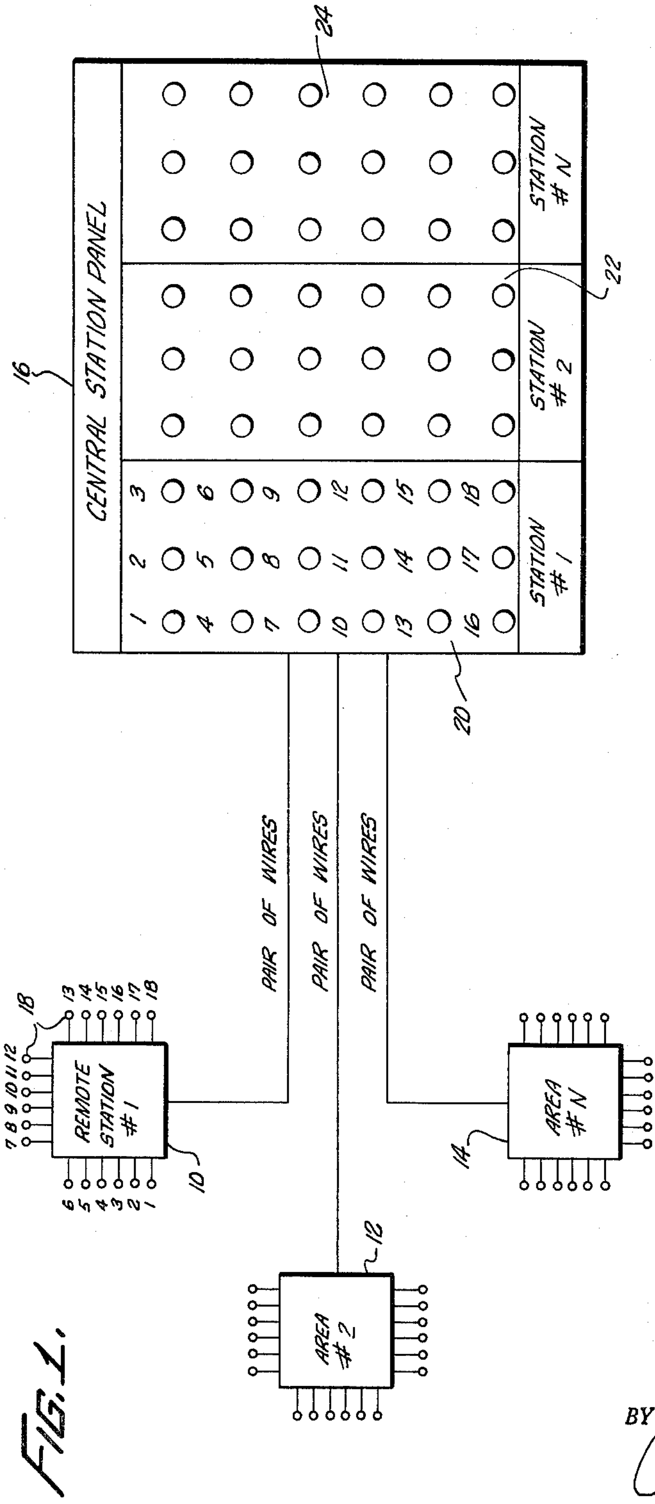
FIG. 1 is a block diagram of the security system of the present invention.
Figure 2:
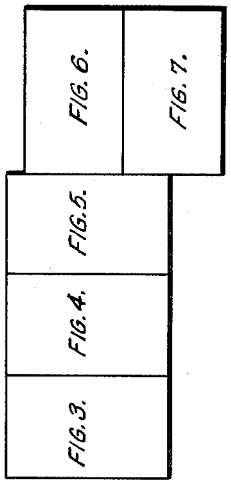

Referring to the drawings in detail, FIG. 1 shows the basic arrangement of the security system according to the present invention in which a plurality of remote stations, three being indicated at 10, 12 and 14, are each connected to a central station 16. Each remote station has a plurality of detecting elements 18 for detecting some abnormal condition, eighteen such elements being shown by way of example only. Each of the detecting elements 18 is connected to the control panel at the remote station by a pair of wires. Each of the remote stations in turn is connected back to the central station 16 by a pair of wires. The control panel at the central station is provided with a plurality of display panels, indicated at 20, 22 and 24, corresponding to each of the remote stations. Each display panel is provided with a plurality of indicator lights corresponding in number to the number of detecting elements at the associated remote station. Activation of any of the detecting elements at any of the remote stations results in an associated light being lit on the control panels at the central station 16 for identifying the exact source of the alarm.

Figure 3:
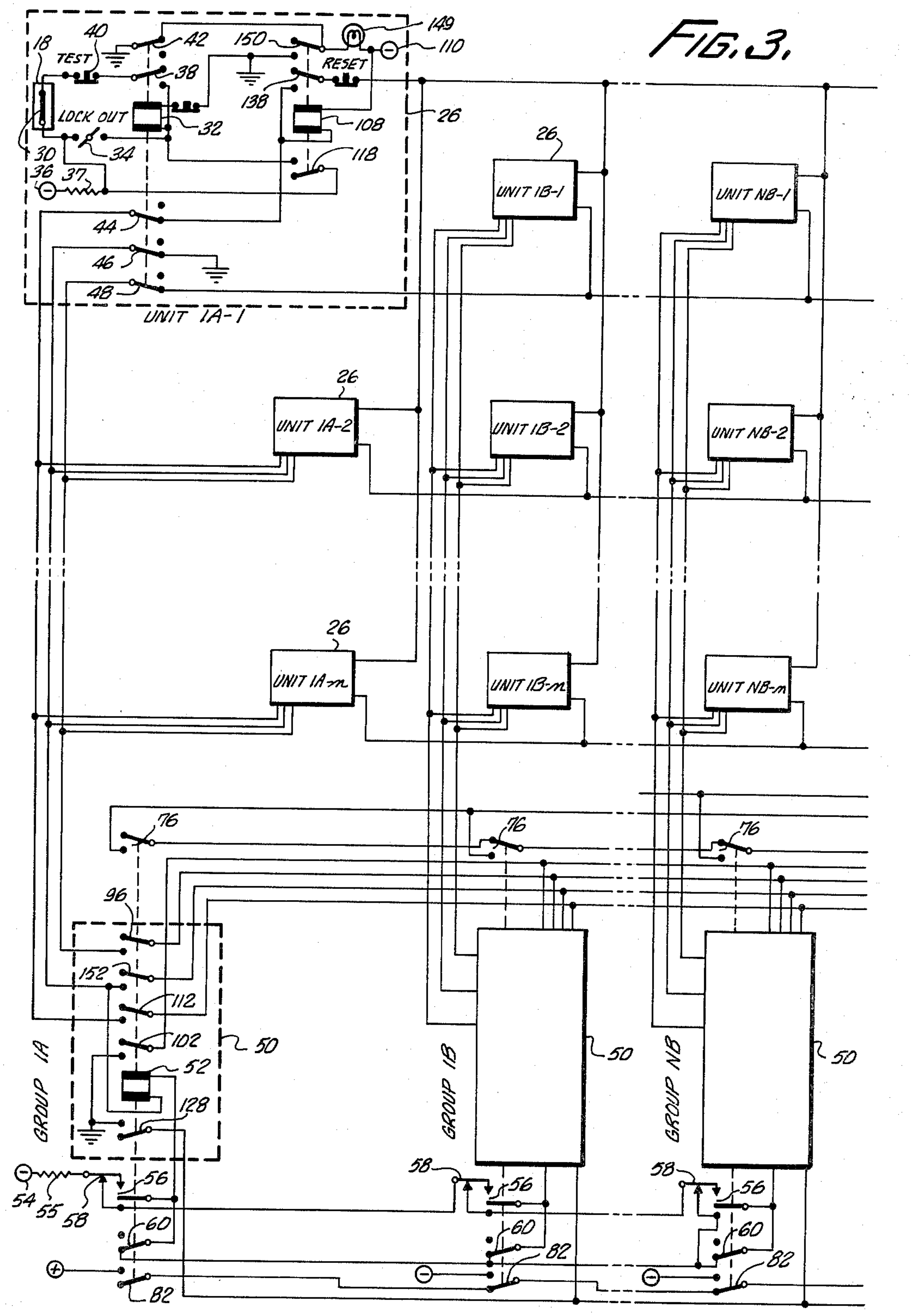
FIGS. 3 to 7 are related to each other.
Figure 4:
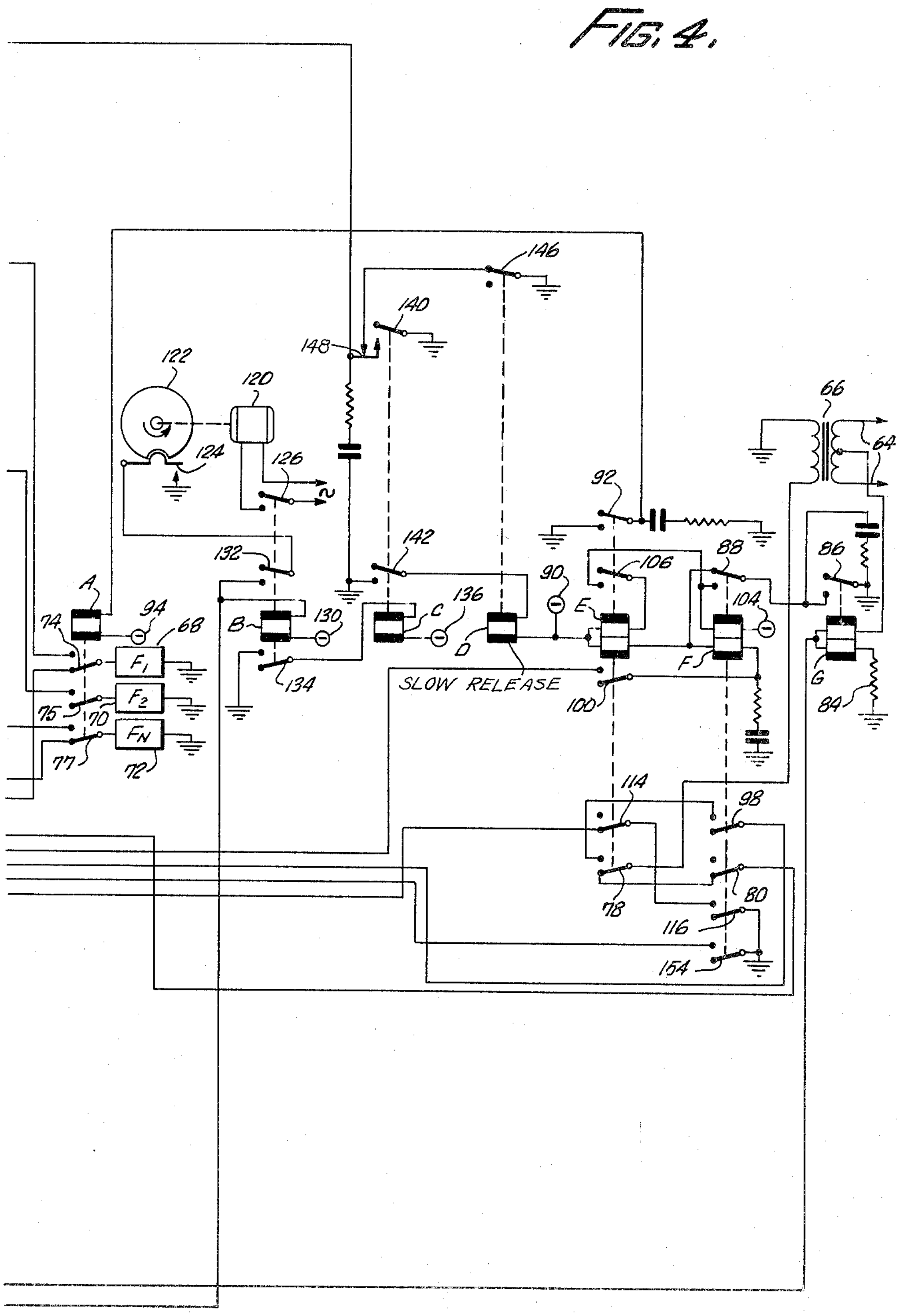

The details of the remote station control panel circuit are shown in FIGS. 3 and 4. There is provided a plurality of identical unit modules 26, which are arranged in the drawings for ease of identification, in vertical columns and horizontal rows. A detection element 18 is associated with each one of these unit modules. The vertical columns of unit modules, referred to as groups, are designated on the drawings as 1A, 1B, . . . NB, while the horizontal rows are designated 1, 2 . . . *n*.

The detection element 18 associated with each unit module may take a variety of forms, depending upon the condition to be detected. For example, the detection element may be a continuous conductor such as commonly used metal tape on windows for indicating a breaking and entering situation. The detecting element 18 may be a pressure sensitive transducer which opens the circuit when the pressure being monitored exceeds a safe level. The detecting element may be a temperature sensitive transducer which breaks a circuit when the temperature exceeds a safe limit. The detecting element may take any of a large number of forms, depending upon the requirements of the user of the system. Whatever form the detecting element takes, it must include some switching means, such as indicated at 30, which normally provides a current path, the current path being interrupted by the detecting means when an alarm condition is indicated.

Each unit module 26 includes a unit control relay 32 which is shown in the drawing in its released condition. However, the unit control relay 32 is normally maintained in an energized state through the closed conductive loop formed by the switching means 30 in the detecting element 18. The relay 32 is initially set by means of a lockout switch 34 which is momentarily closed to complete a current path from a negative potential source 36 through a resistor 37 and the coil of the relay 32 to ground reference. When energized, the unit control relay closes a holding switch 38 which completes a current path from the potential source 36 through the switching means 30 of the detecting element 18 and the coil of the relay 32 back to ground reference. Once the relay 32 is energized, it remains so until an alarm condition arises, opening the switch means 30, or until a push-button test switch 40 is actuated. The lockout switch 34 may be used to hold the relay 32 energized, thus locking out the effect of the detecting element 18. When the unit control relay 32 is energized, the normally closed switches 42, 44, 46 and 48 are open circuited. This is the stand-by condition of all the unit modules.

The unit module circuits 26 in each vertical column have associated therewith a group module 50, three of which are indicated in the drawing as Group 1A, Group 1B, and Group NB. Each group module includes a group control relay 52. When any of the unit control relays 32 is released, the associated relay switch 46 provides a ground connection to one side of the associated group control relay 52. Thus an alarm condition at any of the unit modules in the group 1A–1 through 1A–*n* provides a ground on one side of the relay 52 in the group module 1A. The current path is completed through the relay coil 52 to a negative potential source 54 through a resistor 55. The current path includes relay operated switches associated with the group control relay 52 of each of the group modules. This current path involves switches associated with each of the group control relays. The switching arrangement insures that only one of the group control relays is operated at a time and in a predetermined order of priority. For instance, the group 1A module relay is operated before the group 1B module relay is operated in the event that alarm conditions should exist simultaneously in unit modules associated with both groups.

To this end, each of the group control relays 52 operates a normally open set of contacts 56 and a normally closed set of contacts 58 which are arranged to provide a make-before-break operation in response to energizing of the relay 52. The relay 52 further controls a normally closed switch 60. The negative potential 54 is normally applied to one side of each of the group control relays 52 through the circuit completed by the normally closed contact 58 of each of the group modules connected in series, and then to the individual relay coils through the normally closed switches 60. Thus when ground is applied to the other side of one of the group control relays 52, it is energized. This opens the relay actuated switch 60 but closes the contact 56, thus holding the relay in an energized condition until the ground reference is removed by resetting of the unit control relay. Priority is established by the normally closed contact 58, since, when the group 1A control relay is operated, for example, the opening of contact 58 prevents any of the other group relays from being actuated.

Once a group control relay 52 is energized, it operates to place a group indicative frequency signal across an output line including a pair of output leads 64 connected across the secondary of a transformer 66. See FIG. 4. To this end, the remote station control panel includes a plurality of signal sources, such as the three indicated at 68, 70 and 72, having frequencies of $F_1, F_2, \ldots F_n$. While sources for signals of three different frequencies are shown, it should be noted that the number of frequencies corresponds to the number of unit modules in a group for reasons that will hereinafter become apparent. On the other hand, there may be twice as many group modules as there are different frequencies, there being one frequency signal for each pair of group modules. The frequency sources are preferably tuned vibrating reeds, but any suitable source may be employed. The signal frequencies are in the audio range which can easily be transmitted over a conventional telephone line, the frequency of the several sources differing sufficiently so as to be readily separable by ordinary filtering means.

The output $F_1$ from the first frequency source 68 is connected through the normally closed contact of a relay-operated switch 74 controlled by a relay A and is connected to the normally open contact of a relay operated switch 76 associated with the group control relay 52 of both the group modules 1A and 1B. The relay operated switches 76 are connected in series through their normally closed contacts to the primary winding of the transformer 66 through normally closed relay operated switches 78 and 80 controlled respectively by differential relays designated E and F.

In a similar fashion, it will be understood that the output of the other frequency sources, such as the sources 70 and 72, are connected through the normally closed contacts of switches 75 and 77 operated by the relay A, to the normally open contacts of switches 76 associated with other pairs of group modules. In this manner, the operation of the detection element 18 in any of the unit modules associated with a pair of group modules results in a particular frequency signal being sent to the central station over the transmission line 64.

To provide a signal for distinguishing between one or the other of the two group modules associated with a particular frequency signal, a D.C. potential of one polarity or the other is applied to the center-tap of the secondary of transformer 66. This is accomplished by a normally open switch 82 controlled by the group unit relay 52. (See FIG. 3.) A positive and a negative potential are applied to the normally open contacts of the switches 82 associated with each pair of group modules.

The normally closed contacts of the switches 82 are connected in series to both coils of a differential relay G. A circuit is completed through one coil of the relay G to ground through a resistor 84. A circuit is completed through the other coil of the differential relay G through the transmission line 64 back to the central station. Thus a positive or negative potential is applied to the transmission line with respect to ground, which potential polarity is sensed at the central station, in a manner hereinafter to be described, for determining which of a pair of group modules has been activated.

From the description thus far, it will be seen that if the indicating element 18 associated with the unit module 1A–1 senses an alarm condition, the relay 52 of the group module 1A is energized. This results in a frequency $F_1$ being applied to the transmision line 64. At the same time, the transmission line 64 is biased to a positive potential through the relay switch 82. Alternatively, if the unit module 1B–1 senses an alarm condition, the same frequency $F_1$ is applied to the transmission line 64, but a potential of negative polarity is applied to the transmission line 64. It will be seen that in the unit module designation and the group module designation, the number designates the associated frequency and the letters "A" or "B" designate respectively the positive or negative potential of the transmission line with respect to ground reference.

After the group signal is transmitted, a unit signal must be transmitted to the central station for identifying the particular unit module in the group which is subject to an alarm condition. Each of the unit modules in a horizontal row has one associated frequency signal for identifying it. Thus each unit module in a group has a different frequency associated with it, which frequency identifies the particular unit module at the central station. The unit frequency signal is transmitted, after the group frequency signal has been transmitted, in the following manner.

In normal stand-by operation, the central receiving station, in a manner hereinafter described in detail, provides a current resistance path to ground which is equal to the resistance of the resistor 84. Thus the current divides equally through the two coils of the relay G and the differential relay G does not operate. After the central station responds to the presence of a group signal on the transmission line 64, the resistance path to ground through the transmission line is changed at the central station, thereby unbalancing the current flow through the two coils of the differential relay G.

As a result, a normally open switch 86 operated by the relay G is closed. This connects one side of one coil of the differential relay E to ground through a normally closed relay operated switch 88 controlled by the differential relay F. Thus the relay E is energized by current from a potential source 90. When the relay E is energized, it closes a normally open switch 92, thereby connecting ground potential to one side of the relay coil A, completing a circuit to a potential source 94. The switch 74 now connects the frequency source 68 to all the unit modules in the top row. Similarly, the source 70 is connected by the switch 75 to all the unit modules in the second row and the source 72 is connected by the switch 77 to all the unit modules in the last row.

The switch 48 in a unit module which is in an alarm condition connects the signal from one of the frequency signal sources to the associated group module. Thus the switch 48 in the unit module 1A–1, for example, connects the $F_1$ signal from the source 68 to the group module 1A. Normally open switch 96, controlled by the group relay 52, provides a conductive path through the previously operated group module relay circuit to a normally open relay switch 98 operated by the differential relay F. There is now a unit frequency signal applied to switch 98.

With the operation of relay E as described above, the switch 78 is actuated, breaking the connection of the group frequency signal to the primary of the transformer 66. In a manner hereinafter described, after a small delay interval, the central station operates to restore a balanced current path to the two coils of the differential relay G, thus permitting the switch 86 to open. As a result, the differential relay F is caused to operate by virtue of a current path provided from the potential source 90 through the lower coil of the differential relay E, the lower coil of the differential relay F, a normally open relay operated switch 100 controlled by the differential relay E to a normally open relay operated switch 102 controlled by the group control relay 52 back to ground. With relays E and F operated, the unit frequency signal is now coupled to the primary of the transformer 66 through the switch 98 and the switch 78. As a result, a signal having a frequency designating the unit module in a particular group is now made available at the central station over the transmission line 64.

Having received the unit frequency signal, the central station again produces an unbalance in the differential relay G, causing the switch 86 to again close. Through these circumstances, a current path is provided through the switches 86 and 88 through the upper coil of the differential relay F to a negative potential source 104, thus maintaining the differential relay F in an energized state. However, the switches 86 and 88 provide a ground to one side of the upper coil of the differential relay E through a normally open relay switch 106. As a result, the current produced by the potential source 90 divides equally between the two coils of differential relay E, releasing this relay. By virtue of switch 78, further transmission of the unit frequency signal is then interrupted. Once this signal is interrupted, the central station operates to again balance the differential relay G, permitting the relay to be released and the switch 86 to open. As a result, the relay F is released.

In order that the remote station may be clear to send other alarms, an automatic reset feature is provided to automatically reset the unit module after the transmission is completed. If the alarm condition is not corrected, a two-minute timing cycle control then causes the alarm to be transmitted over again at two-minute intervals to the central station until the condition is corrected. To this end, a reset relay 108 is provided in each of the unit modules. One side of this relay is connected to a negative potential source 110. The other side of the reset relay 108 is connected through the switch 44 controlled by the unit relay 32 through a switch 112 controlled by the group relay 52 through a normally closed relay switch 114 controlled by the relay E back to ground through a normally open switch 116 controlled by the relay F. Thus the reset relay 108 is operated only during the interval in which the relay E has been released, in the manner described, but before the relay F has been released, i.e., the interval in which the relay G is actuated by the central station following the sending of the unit frequency signal. When the reset relay 108 is energized, it operates a normally open switch 118 which completes a circuit through the unit control relay 32 from the negative potential source 36. Thus the unit relay is reset in its normal or stand-by energized condition. Until the alarm condition is removed and the switching means 30 closed again, or until the lockout switch 34 is set to lock out the unit module, release of the reset relay 108 automatically releases the unit control relay 32 and the new alarm condition is transmitted to the central station. The reset relay 108 is automatically released after a two-minute cycle by a timing circuit arrangement.

The timing circuit includes a timing motor 120 (FIG. 4) which drives a cam 122 for opening a switch 124 once each revolution of the cam. A relay B closes a normally open switch 126 for energizing the motor 120. The relay B is energized in response to the energization of a group control relay 52 in any of the group modules by means of a normally open switch 128 associated with each of the group control relays 52. This provides a ground on one side of the relay coil B, the other side of the coil being connected to a negative potential source 130. A holding circuit is provided by means of the cam-operated switch 124 which connects ground to the relay B through a normally open relay switch 132 operated by the relay B. Thus the relay B remains energized for a complete revolution of the cam 122. This time interval is preferably on the order of two minutes. Since the group relay has been released within this time interval, the motor 120 is automatically stopped when the cam 122 reaches the position where the cam-operated switch 124 opens.

When the relay B is energized, it closes a normally open switch 134 which completes a circuit from ground through the coil of a relay C to a negative potential source 136. The relay C operates to hold the reset relay 108 in an energized condition. This is accomplished by a normally open hold switch 138 controlled by the reset relay 108. (See FIG. 3.) The hold switch provides a ground connection to the coil of the relay 108 through a normally open switch 140 controlled by the relay C. As long as relay C remains energized, the reset relay 108 remains energized.

The relay C also controls a normally open switch 142 which, when actuated, provides a current energizing path through a relay D from ground to the negative potential source 90. The relay D is a slow release relay that operates a normally closed switch 146 which provides a connection to ground to a pair of normally closed contacts 148 controlled by the relay C.

By this arrangement, the contacts 124 are opened at the end of one revolution of the cam 122 and relay C is released, removing ground from the reset relay 108. After a delay interval provided by the slow release time of the relay D, a ground connection is re-established through the switch 146 and normally closed contacts 148 back to the reset relay 108. Unless the alarm condition has been alleviated or the lockout switch operated, a new alarm will be initiated when the reset relay 108 is released by the dropping out of relay C.

Whenever the reset relay 108 is energized, it is arranged to turn on an alarm signal provided by a panel light 149 by means of a normally open switch 150 controlled by the relay 108. This permits identification at the remote station as to which unit module is in an alarm condition.

It should be noted that a hold circuit is provided for each of the group control relays 52 to prevent release of the relays until the relay F has been released. Thus a normally open switch 152 controlled by the relay 52 in each of the group modules provides a return to ground from the relay coil through a normally open switch 154 controlled by the relay F. Not until both the unit control relay 32 and the differential relay F have been released can the group relay be released.

Figure 5:
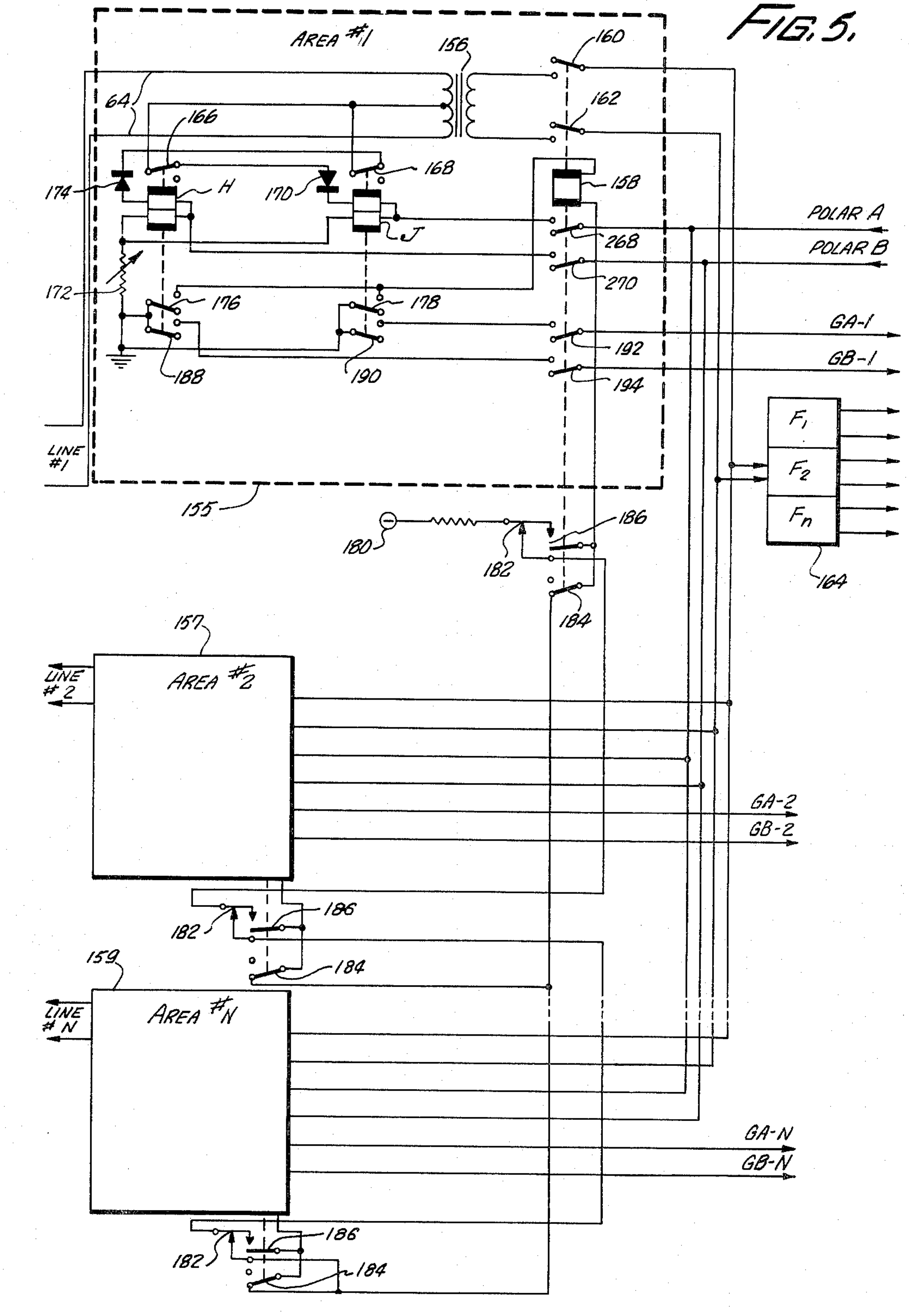

At the central station, the transmission lines from each of the remote stations terminate in an area module circuit, three of which are shown at 155, 157 and 159 in FIG. 5. Each of the area module circuits is identical and includes a transformer 156, the primary of which is connected across the incoming transmission line 64. Each area module circuit includes an area control relay 158. The relay 158, when energized, connects the secondary of the transformer 156 through a pair of normally open switches 160 and 162 to a group of tuned amplifiers indicated generally at 164. Each tuned amplifier of the group responds to a different frequency coming over the transmission line and energizes one of a plurality of outputs.

The area control relay 158 is operated in response to the positive or negative polarity potential applied to the line 64 at the remote station. To this end, the center tap of the primary of the transformer 156 is connected to a pair of normally closed relay operated switches 166 and 168, these switches being controlled respectively by differential relays H and J. The switch 166, controlled by the relay H, completes a circuit through a diode 170, both coils of the differential relay J, through a resistor 172 to ground reference. The center tap of the transformer primary is also connected through the switch 168, through a diode 174, through both coils of the relay H back to ground through the resistor 172. The diodes are oppositely polarized so that if a positive polarity exists on the line 64 with respect to ground, the relay J is operated, whereas if a negative polarity exists, the relay H is energized. Thus, as soon as an alarm condition exists at the remote station, operating one of the group relays, either a positive or a negative polarity exists on the line 64, resulting in one or the other of the relays H and J being energized. The resistor 172 is adjusted so that the current divides equally between the two coils of the relay G. (See FIG. 4.)

By means of normally open switches 176 and 178 controlled respectively by the relays H and J, ground reference is applied to one side of the coil of the relay 158 in response to energizing of either of the relays H or J. A circuit is completed for energizing the relay 158 from a negative potential source 180 by a priority circuit identical to that described above in connection with the operation of the group relays 52 in FIG. 3. Thus the area control relay 158 in each area module includes a normally closed set of contacts 182 which are connected in series with the potential source 180. A normally closed relay operated switch 184 connects each of the area control relay coils to the negative potential source 180 through the series connected normally closed contacts. A normally open set of contacts 186 associated with each area control relay 158 provides a holding current path when the contacts 182 are opened by the energizing of the relay 158. As described above, this type of circuit provides priority of the first area module over the other area modules and, at the same time, prevents more than one area module control relay 158 being energized at a time.

With the energizing of the relays H or J and the area control relay 158, a ground is applied to one of two output leads, designated GA–1 and GB–1, by the closing of one or the other of normally open switches 188 and 190 and by the closing of normally open switches 192 and 194. If an alarm is received from the area module circuit 157, a ground will be applied to one or the other of a pair of output lines similarly designated GA–2 and GB–2, and so on. Again, it will be noted that the designations A and B refer to polarity of the signal received from the remote station.

Figure 6:
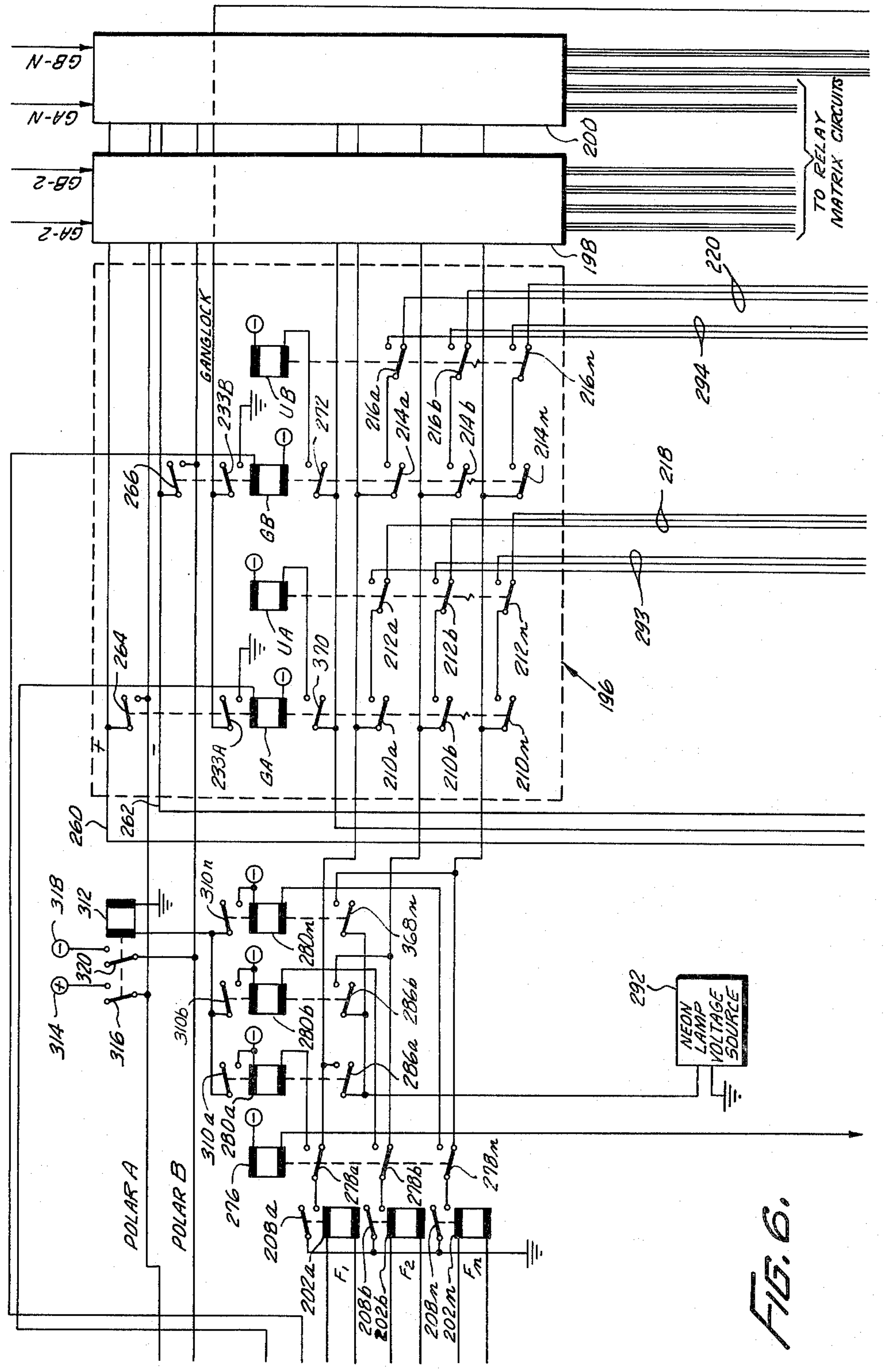

The GA–1 line and the GB–1 line extend to a group-unit module circuit, as shown in FIG. 6, three of which are indicated at 196, 198 and 200. These group-unit module circuits are identical, there being one associated with each area module circuit of FIG. 5. The function of the group-unit module circuit is to designate whether the signal being received is a group frequency signal or a unit frequency signal. To this end, the group-unit module 196 includes a GA relay and a GB relay which are connected respectively to the lines GA–1 and GB–1. One or the other of these relays is energized from a negative potential source in response to the ground connection applied to one or the other of the lines GA–1 and GB–1.

As mentioned above, the incoming group frequency signal received in response to an alarm is applied to the tuned amplifiers 164, energizing one of a plurality of outputs, depending upon the frequency. There are as many outputs as there are frequencies represented by the frequency sources at the remote stations. Though only three are indicated, as many as twenty-five different frequencies with corresponding outputs may be provided.

Each of the outputs from the tuned amplifiers 164 operates a corresponding one of as many relays, such as indicated at 202$a$, 202$b$, . . . 202$n$, where $n$ is the number of different frequencies employed. Since identical circuits are associated with each of these relays, only one will be described in detail. Thus the relay 202$a$ operates a normally open switch 208$a$ which applies a ground reference to each of the group-unit modules. The GA and GB relays operate a plurality of normally open switches corresponding in number to the number of frequencies. Thus switches 210$a$–$n$ are operated by the relay GA for extending ground reference to one side of a plurality of switches 212$a$–$n$ operated by a relay UA. Similarly, the ground established by one of the relays 202$a$–$n$ in response to a particular frequency signal received from the remote station may be extended by means of one of a plurality of normally open switches 214$a$–$n$ operated by the relay GB to a particular one of plurality of switches 216$a$–$n$ controlled by a relay UB.

From the description thus far, it will be recognized that in response to a group signal from the first remote station, a ground reference is provided on one of 2$n$ number output leads from the normally closed contacts of the switches 212$a$–$n$ and 216$a$–$n$, wherein $n$ is the number of possible different frequencies established at the remote station. The leads coming from the normally closed contacts of the UA relay operated switches 212$a$–$n$ are indicated at 218. The leads from the normally closed contacts of the switches 216$a$–$n$ controlled by the relay UB are indicated at 220. The UA and UB relays remain unenergized until the unit frequency signal is transmitted from the remote station. It will be seen that the function of the relays GA and GB is to store information as to the polarity of the incoming signal, whereas the function of the UA and UB relays is to store information as to whether a group frequency signal or a unit frequency signal is being received.

The output leads 218 are applied to a relay matrix circuit indicated generally at 222. The relay matrix circuit includes $n$ number of relays 224$a$–$n$, corresponding to the number of different frequencies possible at the remote stations. These relays are energized by having one side of the coil grounded through one of the leads 218, the other side of each of the relays being connected to a negative potential source. Assuming a group frequency $F_1$ has been received, the relay 224$a$ is energized. A similar relay matrix circuit, such as indicated at 230 and 232, identical in circuitry to that of the relay matrix circuit 222, is associated with each UA relay and each UB relay in each of the group-unit circuits. Thus one relay is energized in the relay matrix circuits as determined by the polarity and the group frequency signal received in response to an alarm at one of the remote stations.

A lockup circuit for the relays 224$a$–$n$ as well as similar relays in all the other relay matrix circuits is provided. Switches 231$a$–$n$ operated by the respective relays 224$a$–$n$ connect the ground potential side of the energized relay back to ground through switches, such as indicated at 233A and 233B, operated by the relays GA and GB.

Once the group frequency signal has been noted, the central station has to actuate the relay G (see FIG. 4) at the remote station to initiate transmission of a unit frequency signal in the manner described. To this end, each of the relays in the relay matrix circuits has associated therewith a switch, such as indicated at 234$a$–$n$. The normally closed contacts for the switches 234$a$–$n$ provide a series current path to ground from a negative potential source 236 through a series capacitor 238 and resistor 240. Thus a charge is normally stored on the capacitor 238. The normally open contacts from the switches 234*a–n* are all connected to one side of a relay 242, which is also connected to a negative potential source 243. Thus, when one of the switches 234*a–n* is actuated, the charge on the capacitor 238 discharges through the relay 242, energizing it for a period of time determined by the size of the capacitor 238 and the combined resistance of the resistor 240 and the coil of the relay 242. The relay 242 momentarily closes a switch 244, completing a circuit from ground to a negative potential source 247 through a relay 246. This closes a normally open switch 248, thereby providing a ground to one side of a relay 250 through one of the switches 233A or 233B operated respectively by the GA or the GB relays in the group-unit circuits. When the relay 242 releases after a short time interval, opening the switch 244, the relay 250 is energized.

Relay 242 actuates two normally open switches 252 and 254 which connect a positive potential source 256 and a negative potential source 258 respectively to leads 260 and 262 which go to each of the group-unit circuits 196, 198 and 200. A normally open switch 264 operated by the relay GA connects the positive potential on the lead 260 to a polar A lead which extends back to each of the area module circuits of FIG. 5. Similarly, a switch 266 operated by the GB relay connects the negative potential of the lead 262 to a polar B lead which extends back to each of the area module circuits of FIG. 5. Thus, either a positive or negative potential is applied respectively to the polar A lead or the polar B lead, depending upon whether a GA relay has been set or a GB relay has been set.

As shown in FIG. 5, the polar A lead extends to normally open switch 268 operated by the area control relay 158 in each of the area modules. Switch 268 applies the polarity on the polar A lead to one side of both the coils of the differential relay J. Similarly, the polar B lead is connected by switch 270 to one side of each of the coils of the differential relay H. Assuming a positive polarity has been established by the group control relay 52 at the remote station (see FIG. 3), the positive potential resulting on the polar A lead as applied to the differential relay J upsets the balanced current condition in the differential relay G (see FIG. 4), causing the relay G to become energized. This results in a unit frequency signal being transmitted to the central station in the manner described above. In the same manner, if a negative polarity has been established at the remote station, the negative potential applied through the polar B lead to the relay H also results in energization of the differential relay G at the remote station.

Figure 7:
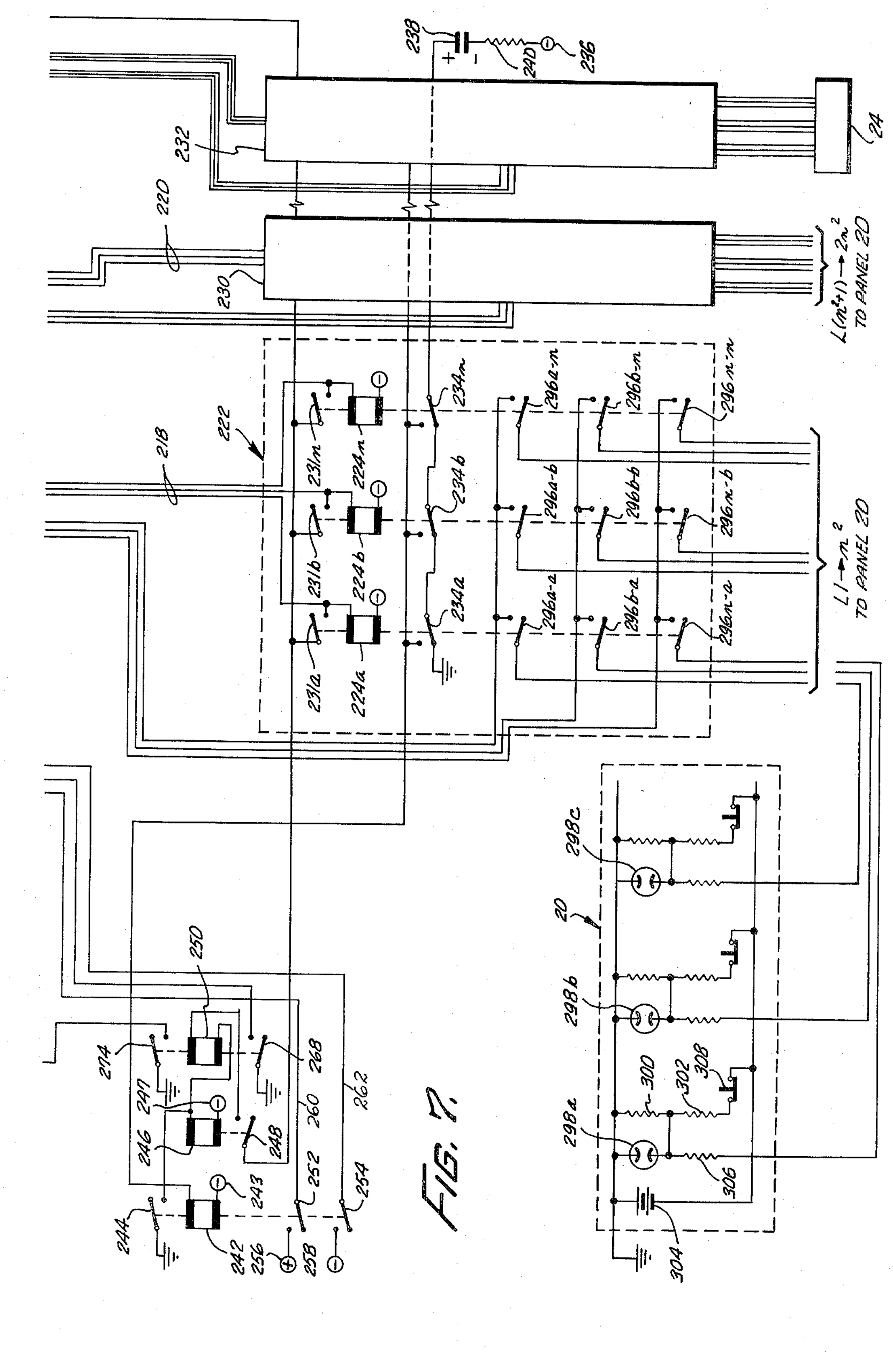

After the relay 242 releases and the relay 250 is energized (see FIG. 7), a ground connection is completed through a normally open switch 368 operated by the relay 250. This provides a ground to one side of either the relay UA or the relay UB, respectively, through normally open switches 370 and 272, operated by the relays GA and GB. Thus a circuit is completed through one or the other of the relays UA and UB through a negative potential source.

At the same time, the relay 250 operates a normally open switch 274 for completing a circuit from ground to negative potential source through a relay 276. The relay 276 operates a plurality of switches 278*a–n* which respectively connect the ground potential established by one of the relays 202*a–n* to one side of one of three relays 280*a–n*. Normally open switches 286*a–n* are associated respectively with the relays 280*a–n* for connecting a neon lamp voltage source 292 to the switches 210*a–c* and 214*a–c* in the group-unit circuits 196, 198 and 200.

In this manner, when the unit frequency signal is received from the remote station and one of the relays 202*a–n* is energized, the neon lamp voltage source is connected to one of $n$ number of leads 293 associated with the normally open contacts of the switches 212*a–n*, or one of $n$ number of leads 294 from switches 216*a–n*. The leads 293 extend to the relay matrix circuit 222 for energizing one of $n^2$ output leads from the neon lamp voltage source 292. The relay matrix circuit 222 includes $n$ groups of switches 296, each group including $n$ number of switches controlled respectively by the relays 224*a–n*. Thus a matrix switching arrangement is provided by which one out of $n^2$ leads is energized, depending upon which of the relays 224*a–n* is energized in response to the group frequency signal and which of the input leads 293 is energized in response to the unit frequency signal.

Similarly, the leads 294 extend to the relay matrix circuit 230. In the event a negative polarity is received from the remote station, the relay matrix circuit 230 energizes one of $n^2$ output leads from the neon lamp source 292. Thus one of $2n^2$ leads is energized from the neon lamp voltage source 292 in response to a complete alarm transmission from a remote station, including a polarity signal, a group frequency signal, and a unit frequency signal.

The output leads from the two relay matrix circuits 222 and 230 extend to the area indicator panel 20 at the central station which provides $2n^2$ neon indicator lamps which are selectively lit in response to an alarm condition at the associated remote station.

The panel light circuit includes a plurality of neon lights, only three of which are indicated at 298*a–c*. Each of the lamps is connected across a portion of a voltage divider provided by two resistors 300 and 302 connected across a potential source 304. One of the output lines from the matrix circuits 222 and 230 is connected to each of the neon lamps through a resistor 306. When the associated lead from the matrix circuit is energized from the neon lamp voltage source 292, the neon lamp is fired. The voltage divider provides sufficient potential across the fired neon lamp to maintain the lamp lit even after the neon voltage source 292 is removed. Thus the lamp continues to indicate an alarm condition until it is turned off by operating an associated push-button switch 308.

When the unit frequency signal is received and one of the relays 208*a–n* (FIG. 6) is energized, one of the associated normally open switches 310*a–n* is closed, completing a circuit through the associated relay 280*a–n* back to ground through a relay 312. The relay 312, when energized, connects a positive potential source 314 through a normally open switch 316 to the polar A lead and also connects a negative potential source 318 through a normally open switch 320 to the polar B lead. As a result, the differential relay G at the remote station (see FIG. 4) is again energized and, in the manner described above, the remote station is reset, stopping the transmission of the unit frequency signal. This releases one of the relays 202*a–n* and so relay 312 drops out. Relay G at the remote station is thereby released and the remote station is restored to stand-by condition.

When the polarity signal is removed at the remote station, differential relays H and J and the group control relay 158 in the area module circuit (see FIG. 5) are released. As a result, ground reference is removed from the GA–1 and GB–1 leads, permitting the GA or the GB relay to release, and also the associated UA or UB relay to release. Release of the GA or GB relays removes ground reference from the holding circuits on the relays 246, 250, 224*a–n* (FIG. 7) and 276 (FIG. 6). Thus the central station is stored to its initial stand-by condition, ready to receive the next alarm, except that the appropriate neon light 298 remains lit, providing a continuous alarm indication.

From the above description, it will be recognized that a system is provided in which an alarm and source indication are made at a central station in response to any one of a large number of alarm indicating units. Whole areas, each including a large number of alarm units, are serviced over a single telephone line to each area. If more than one alarm is actuated at a time, they all get recorded. Thus alarms from different areas are processed sequentially according to a predetermined priority at the central station. Alarms from different groups are processed sequentially according to a predetermined priority. Alarms from different units in the same group are processed simultaneously as two transmitted unit frequency signals of different frequency.

The system can be enlarged, if desired, to include audio as well as visual alarms at the central station, and to provide a permanent printed record identifying the time and location of every alarm with modification of the basic circuit arrangement. Thus a complete security system is provided with a minimum of installation cost, yet affording centralized operation.

What is claimed is:

1. In a security system in which a plurality of remote stations are monitored from a single central station that is connected to each of the remote stations by a single pair of wires, the combination comprising, at each remote station, a plurality of detection elements for sensing particular alarm conditions, means for generating a plurality of signals of different frequency, means responsive to the actuation of any one of a group of said detection elements for coupling to the pair of wires a first selected frequency signal indicative of the group of detection elements for transmission to the central station, means responsive to the actuation of any one of a group of said detection elements for applying a D.C. potential of a selected polarity to the two wires, means responsive to a first signal from the central station and the actuated detection element for coupling to the pair of wires a second selected frequency signal indicative of the particular actuated detector element in said group, means responsive to a second signal from the central station following the transmission of the second selected frequency signal for by-passing the detection element a predetermined time interval to permit alarm signals to be initiated by other of the detection elements, the combination further comprising, at the central station, a plurality of indicator elements, there being one indicator element for each detection element at the remote stations, a plurality of matrix circuit means, each matrix circuit means selectively actuating any one of a portion of said indicator elements in response to a first signal applied to any one of a first group of inputs and a second signal applied to any of a second group of inputs, means responsive to the frequency of signals received over the wires from any of the remote stations for activating one of a plurality of outputs corresponding in number to the number of possible different frequencies, means responsive to the polarity of a potential on the wires from any one of the remote stations for connecting the outputs of the frequency responsive means to the first group of inputs of a particular one of the matrix circuits, whereby one of the inputs to one of the matrix circuits is activated in response to the group frequency signal from the remote station, means responsive to the activation of one of the first group of inputs to the selected matrix circuit for transmitting said first signal back to the remote station to initiate the unit frequency signal, the unit frequency signal when received activating one of the plurality of outputs of said frequency responsive means, means responsive to the end of the group frequency signal and start of the unit frequency signal for transferring the connection of the outputs of the frequency responsive means to the second group of inputs, whereby one of the second group of inputs of the particular matrix circuit is activated in response to the unit frequency signal, and means responsive to the activation of one of the second group of inputs to the particular matrix circuit for transmitting said second signal to the remote station to initiate the timed by-passing of the detector element that produced the alarm.

2. In a security system in which a plurality of remote stations are monitored from a single central station that is connected to each of the remote stations by a single pair of wires, the combination comprising, at each remote station, a plurality of detection elements for sensing particular alarm conditions, means for generating a plurality of signals of different frequency, means responsive to the actuation of any one of a group of said detection elements for coupling to the pair of wires a first selected frequency signal indicative of the group of detection elements for transmission to the central station, means responsive to the actuation of any one of a group of said detection elements for applying a D.C. potential of a selected polarity to the two wires, means responsive to a first signal from the central station and the actuated detection element for coupling to the pair of wires a second selected frequency signal indicative of the particular actuated detector element in said group, the combination further comprising, at the central station, a plurality of indicator elements, there being one indicator element for each detection element at the remote stations, a plurality of matrix circuit means, each matrix circuit means selectively actuating any one of a portion of said indicator elements in response to a first signal applied to any one of a first group of inputs and a second signal applied to any of a second group of inputs, means responsive to the frequency of signals received over the wires from any of the remote stations for activating one of a plurality of outputs corresponding in number to the number of possible different frequencies, means responsive to the polarity of a potential on the wires from any one of the remote stations for connecting the outputs of the frequency responsive means to the first group of inputs of a particular one of the matrix circuits, whereby one of the inputs to one of the matrix circuits is activated in response to the group frequency signal from the remote station, means responsive to the activation of one of the first group of inputs to the selected matrix circuit for transmitting said first signal back to the remote station to initiate the unit frequency signal, the unit frequency signal when received activating one of the plurality of outputs of said frequency responsive means, and means responsive to the end of the group frequency signal and start of the unit frequency signal for transferring the connection of the outputs of the frequency responsive means to the second group of inputs, whereby one of the second group of inputs of the particular matrix circuit is activated in response to the unit frequency signal.

3. In a security system in which a plurality of remote stations are monitored from a single central station that is connected to each of the remote stations by a single pair of wires, the combination comprising, at each remote station, a plurality of detection elements for sensing particular alarm conditions, means for generating a plurality of signals of different frequency, means responsive to the actuation of any one of a group of said detection elements for coupling to the pair of wires a first selected frequency signal indicative of the group of detection elements for transmission to the central station, means responsive to a first signal from the central station and the actuated detection element for coupling to the pair of wires a second selected frequency signal indicative of the particular actuated detector element in said group, means responsive to a second signal from the central station following the transmission of the second selected frequency signal for by-passing the detection element a predetermined time interval to permit alarm signals to be initiated by other of the detection elements, the combination further comprising, at the central station, a plurality of indicator elements, there being one indicator element for each detection element at the remote stations, a plurality of matrix circuit means, each matrix circuit means selectively actuating any one of a portion of said indicator elements in response to a first signal applied to any one of a first group of inputs and a second signal applied to any of a second group of inputs, means responsive to the frequency of signals received over the wires from any of the remote stations for activating one of a plurality of outputs corresponding in number to the number of possible different frequencies, means for connecting the outputs of the frequency responsive means to the first group of inputs of a particular one of the matrix circuits, whereby one of the inputs to one of the matrix circuits is activated in response to the group frequency signal from the remote station, means responsive to the activation of one of the first group of inputs to the selected matrix circuit for transmitting said first signal back to the remote station to initiate the unit frequency signal, the unit frequency signal when received activating one of the plurality of outputs of said frequency responsive means, means responsive to the end of the group frequency signal and start of the unit frequency signal for transferring the connection of the outputs of the frequency responsive means to the second group of inputs, whereby one of the second group of inputs of the particular matrix circuit is activated in response to the unit frequency signal, and means responsive to the activation of one of the second group of inputs to the matrix circuit for transmitting said second signal to the remote station to initiate the timed by-passing of the detector element that produced the alarm.

4. In a security system in which a plurality of remote stations are monitored from a single central station that is connected to each of the remote stations by a single pair of wires, the combination comprising, at each remote station, a plurality of detection elements for sensing particular alarm conditions, means for generating a plurality of signals of different frequency, means responsive to the actuation of any one of a group of said detection elements for coupling to the pair of wires a first selected frequency signal indicative of the group of detection elements for transmission to the central station, means responsive to a first signal from the central station and the actuated detection element for coupling to the pair of wires a second selected frequency signal indicative of the particular actuated detector element in said group, the combination further comprising, at the central station, a plurality of indicator elements, there being one indicator element for each detection element at the remote station, a plurality of matrix circuit means, each matrix circuit means selectively actuating any one of a portion of said indicator elements in response to a first signal applied to any one of a first group of inputs and a second signal applied to any of a second group of inputs, means responsive to the frequency of signals received over the wires from any of the remote stations for activating one of a plurality of outputs corresponding in number to the number of possible different frequencies, means for connecting the outputs of the frequency responsive means to the first group of inputs of a particular one of the matrix circuits, whereby one of the inputs to one of the matrix circuits is activated in response to the group frequency signal from the remote station, means responsive to the activation of one of the first group of inputs to the selected matrix circuit for transmitting said first signal back to the remote station to initiate the unit frequency signal, the unit frequency signal when received activating one of the plurality of outputs of said frequency responsive means, and means responsive to the end of the group frequency signal and start of the unit frequency signal for transferring the connection of the outputs of the frequency responsive means to the second group of inputs, whereby one of the second group of inputs of the particular matrix circuit is activated in response to the unit frequency signal.

5. In a security system in which a plurality of remote stations are monitored from a single central station that is connected to each of the remote stations by a single pair of wires, the combination comprising, at each remote station, a plurality of detection elements for sensing particular alarm conditions, means for generating a plurality of signals of different frequency, means responsive to the actuation of any one of a group of said detection elements for coupling to the pair of wires a first selected frequency signal indicative of the group of detection elements for transmission to the central station, means responsive to the actuation of any one of a group of said detection elements for applying a D.C. potential of a selected polarity to the two wires, means responsive to the actuated detection element for coupling to the pair of wires a second selected frequency signal indicative of the particular actuated detector element in said group, the combination further comprising, at the central station, a plurality of indicator elements, there being one indicator element for each detection element at the remote stations, a plurality of matrix circuit means, each matrix circuit means selectively actuating any one of a portion of said indicator elements in response to a first signal applied to any one of a first group of inputs and a second signal applied to any of a second group of inputs, means responsive to the frequency of signals received over the wires from any of the remote stations for activating one of a plurality of outputs corresponding in number to the number of possible different frequencies, means responsive to the polarity of a potential on the wires from any one of the remote stations for connecting the outputs of the frequency responsive means to the first group of inputs of a particular one of the matrix circuits, whereby one of the inputs to one of the matrix circuits is activated in response to the group frequency signal from the remote station, the unit frequency signal when received activating one of the plurality of outputs of said frequency responsive means, and means responsive to the end of the group frequency signal and start of the unit frequency signal for transferring the connection of the outputs of the frequency responsive means to the second group of inputs, whereby one of the second group of inputs of the particular matrix circuit is activated in response to the unit frequency signal.

6. In a security system in which a plurality of remote stations are monitored from a single central station that is connected to each of the remote stations by a single pair of wires, the combination comprising, at each remote station, a plurality of detection elements for sensing particular alarm conditions, means for generating a plurality of signals of different frequency, means responsive to the actuation of any one of a group of said detection elements for coupling to the pair of wires a first selected frequency signal indicative of the group of detection elements for transmission to the central station, means responsive to the actuated detection element for coupling to the pair of wires a second selected frequency signal indicative of the particular actuated detector element in said group, the combination further comprising, at the central station, a plurality of indicator elements, there being one indicator element for each detection element at the remote stations, a plurality of matrix circuit means, each matrix circuit means selectively actuating any one of a portion of said indicator elements in response to a first signal applied to any one of a first group of inputs and a second signal applied to any of a second group of inputs, means responsive to the frequency of signals received over the wires from any of the remote stations for activating one of a plurality of outputs corresponding in number to the number of possible different frequencies, means for connecting the outputs of the frequency responsive means to the first group of inputs of a particular one of the matrix circuits, whereby one of the inputs to one of the matrix circuits is activated in response to the group frequency signal from the remote station, the unit frequency signal when received activating one of the plurality of outputs of said frequency responsive means, and means responsive to the end of the group frequency signal and start of the unit frequency signal for transferring the connection of the outputs of the frequency responsive means to the second group of inputs, whereby one of the second group of inputs of the particular matrix circuit is activated in response to the unit frequency signal.

7. A security system for producing an alarm indication at a central station in response to any one of a plurality of alarm sensing devices at a remote station, the alarm sensing devices being arranged in identifiable pairs of groups, said system comprising first means for generating a plurality of signals of different frequency, there being a different frequency for each pair of groups, means for generating signals of first and second D.C. potentials, there being a different potential for each of the groups in a pair, second means for generating a plurality of signals of different frequency, there being a different frequency for each sensing device in a group, means responsive to actuation of an alarm device for transmitting a signal of particular frequency from the first signal generating means indicating the group pair in which the device is located, means responsive to actuation of the alarm device for transmitting a signal of particular potential indicating in which group in the pair the device is located, means responsive to actuation of the alarm device for transmitting a signal of particular frequency from the second generating means indicating the particular device in the group, the signals from the first and second signal generating means being transmitted successively over a common transmission link to the central station, indicator means at the central station arranged in two groups, two matrix circuits for actuating the indicator means, there being one matrix circuit for each group of indicator means, each matrix circuit having two sets of inputs, one associated indicating means being selectively actuated in response to activating one input in each set of inputs, means responsive to the frequency of the signal transmitted from the first signal generating means for activating a particular input of one of said sets of inputs to one or the other of the matrix circuits, means responsive to the frequency of the signal transmitted from the second signal generating means for activating a particular input of the other of said sets of inputs to one or the other of the matrix circuits, and means responsive to the potential level of the remaining signal for determining which of the matrix circuit inputs are activated.

8. A security system having a central station and at least one remote station, said remote station having a plurality of detector elements each actuable in response to a different alarm condition, the detector elements of each remote station being divided into at least one pair of groups, first means located at said remote station for generating a plurality of signals having different frequencies of alternating potential, said frequencies equaling in number the maximum number of detector elements in a group in said remote station, each of the detector elements of a group having associated therewith a different one of said frequencies, said one pair of groups in a remote station having associated therewith one of said frequencies, second means located at said remote station for producing direct potentials having opposite polarities with respect to a reference of potential, each of the groups of said pair having associated therewith a different one of said polarities, means responsive to actuation of one of said detector elements for transmitting from said first means to said central station a first signal having the frequency of alternating potential associated with said pair of groups of detector elements which includes said one detector element and from said second means a second signal having the polarity of direct potential associated with the one of such groups which includes said one detector element, means responsive to said first and second signals and to said actuation of said one detector element for transmitting to said central station from said first means a third signal having the frequency of alternating potential associated with said one detector element, and means located at said central station responsive to said first, second and third signals and specific to said one detector element for indicating the actuation thereof.

9. A security system having a central station and at least one remote station, said remote station having a plurality of detector elements each actuable in response to a different alarm condition, said detector elements being divided into a plurality of pairs of groups of said elements, each group including a plurality of detector elements, first means located at said remote station for generating a plurality of signals having different frequencies, each frequency being indicative of one of said pairs of groups, second means located at said remote station for producing direct potential having selectively opposite polarities with respect to a reference potential, each polarity being indicative of a group of each said pair and the opposite polarity of the other group of said last-named pair, means responsive to actuation of one of said detector elements for transmitting from said first means to said central station a first signal having a frequency indicative of a pair of groups of detector elements of said remote station including said one detector element, and from said second means a second signal having a polarity of direct potential indicative of the one of said groups which includes said one detector element, means, responsive to said first and second signals and to said actuation of said one detector element, for transmitting to said central station from said first means a third signal having a frequency indicative of the actuation of said one detector element, and means located at said central station responsive to said first, second and third signals for indicating that said one detector element specifically is actuated.

10. A security system having a central station and at least one remote station, said remote station having a plurality of detector elements each actuable in response to a different alarm condition, said detector elements being divided into a plurality of pairs of groups of said elements, each group including a plurality of detector elements, first means located at each remote station for generating a plurality of signals having different frequencies of alternating potential, each frequency being indicative of one of said pairs of groups, second means located at each remote station for producing direct potential having selectively opposite polarities with respect to a reference of potential, each polarity being indicative of a group of each said pair and the opposite polarity of the other group of said last-named pair, means, responsive to actuation of one of said detector elements, for transmitting from said first means to said central station a first signal having a frequency of alternating potential indicative of a pair of groups of detector elements of said remote station including said one detector element, and from said second means a second signal having a polarity of direct potential indicative of the one of said groups which includes said one detector element, and means, responsive to said first and second signals, for indicating at said central station that said one detector element specifically is actuated.

11. A security system having a central station and at least one remote station, said remote station having a plurality of detector elements each actuable in response to a different alarm condition, said detector elements being divided into at least one pair of groups, each group including a plurality of detector elements, first means associated with said remote station for producing a plurality of different first signals, one of said signals being indicative of said pair of groups, second means associated with each remote station for producing a pair of different second signals each also differing from each of said first signals, one of said pair of second signals being indicative of one group of said pair of groups and the other of said pair of signals being indicative of said other group of said pair of groups, means, responsive to actuation of one of said detector elements, for transmitting from said first means to said central station said one of said first signals indicative of a pair of groups of detector elements of said remote station including said one detector element, and from said second means one of said second signals indicative of the one of said groups which includes said one detector element, means, responsive to such transmitted first and second signals, for interrogating said remote station, means responsive to such interrogation and to said actuation of said one detector element for transmitting to said central station from said first means another of said first signals indicative of the actuation of said one detector element, and means located at said central station, responsive to such transmitted signals and specific to said one detector element, for indicating such actuation thereof.

12. A security system as claimed in claim 11, in which each remote station is connected to the central station by a single pair of wires, all of said transmitted signals being transmitted to the central station by the associated pair of wires, in combination with priority means for establishing a predetermined sequence of initial indication at the central station of the concurrent actuation of detector elements in the group of a remote station, and means responsive to said transmitted signals for by-passing said one detector element for a predetermined time.

References Cited by the Examiner

UNITED STATES PATENTS

| | | | |
|---|---|---|---|
| 2,121,357 | 6/38 | Lindsey | 340—227 |
| 2,512,639 | 6/50 | Gohorel | 340—147 |
| 2,576,479 | 11/51 | Rees | 340—163 |
| 2,610,255 | 9/52 | Den Hertog et al. | 340—171 |
| 2,636,164 | 4/53 | Lubin et al. | 340—171 |
| 2,775,646 | 12/56 | Grosjean | 179—15 |
| 2,784,393 | 3/57 | Schultheis | 340—171 |
| 2,816,218 | 12/57 | Rees et al. | 340—171 |
| 2,840,815 | 6/58 | Andres et al. | 179—15 |
| 2,906,998 | 9/59 | Costa | 340—171 |
| 3,034,100 | 5/62 | Brixner | 340—163 |

FOREIGN PATENTS

| | | |
|---|---|---|
| 713,631 | 8/54 | Great Britain. |

NEIL C. READ, *Primary Examiner.*

BENNET G. MILLER, ROBERT H. ROSE, *Examiners.*